US005465880A

United States Patent [19]
Glynn

[11] Patent Number: 5,465,880
[45] Date of Patent: Nov. 14, 1995

[54] DOUBLE ACTION SPRAY DISPENSER

[75] Inventor: Kenneth P. Glynn, Raritan Township, Hunterdon County, N.J.

[73] Assignee: Ideal Ideas, Inc., Flemington, N.J.

[21] Appl. No.: 257,548

[22] Filed: Jun. 9, 1994

[51] Int. Cl.$^6$ .......... G01F 11/00
[52] U.S. Cl. .......... 222/321.8; 222/340; 222/383.1
[58] Field of Search .......... 222/320, 321, 222/340, 341, 383, 385; 239/333

[56] References Cited

U.S. PATENT DOCUMENTS

| | | | |
|---|---|---|---|
| 3,945,401 | 3/1976 | Greenwood | 137/627.5 |
| 4,079,865 | 3/1978 | Kutik | 222/321 X |
| 4,225,060 | 9/1980 | Kutik et al. | 222/340 X |
| 4,396,132 | 8/1983 | Christensen | 222/341 X |
| 4,503,996 | 3/1985 | Sorm et al. | 222/321 |
| 4,646,969 | 3/1987 | Sorm et al. | 222/340 X |
| 4,830,046 | 5/1989 | Holt | 137/460 |

*Primary Examiner*—Andres Kashnikow
*Assistant Examiner*—Joseph A. Kaufman
*Attorney, Agent, or Firm*—Kenneth P. Glynn

[57] ABSTRACT

The present invention is a continuous action spray dispenser for spraying liquid material therefrom. It includes a main housing with a housing outlet and a housing inlet, adapted to receive a pumping rod and having a connecting mechanism for connection to a container. It also includes a pumping rod which is at least partially located within the main housing so as to be vertically reciprocally movable therein. The rod has a predetermined shape, volume and displacement with a first, upward position and a second, downward position and includes a valve seat and one-way valve which permits liquid material to pass therethrough in a relative direction toward the outlet, but not toward the inlet. There is also an inlet valve seat and valve connected to the inlet of the main housing and arranged so as to permit flow of fluid material into, but not out of, the main housing inlet. There is a top housing connected to the upper end of the main housing adapted for reciprocal movement with an activator. There is an outlet channel and spray nozzle, as well as a spring mechanism cooperatively located between the activator and the top housing which biases the activator and pumping rod to their first position.

17 Claims, 4 Drawing Sheets

DOUBLE ACTION SPRAY DISPENSER

BACKGROUND OF THE INVENTION

1. Field of the Invention

The present invention involves spray dispensers which rely upon pump action by a user for dispensing liquids by spraying. More particularly, the present invention relates to a double action sprayer, i.e., one which sprays both when the actuator moves downward and when the actuator moves upward. The present invention spray dispensers eliminate a number of parts and significantly reduce valve friction and wearing of components compared to the Prior Art devices.

2. Information Disclosure Statement

Various double action sprayers have been developed over the years and the Academy of Sciences of Czechoslovakia developed a double action liquid atomizer and a double action trigger sprayer liquid atomizer. These are described in the patent literature as follows:

U.S. Pat. No. 4,503,996 issued to Miloslav Sorm et al. describes a liquid atomizer having a reciprocable pump. The atomizer provides a reliable sealing of the piston rod of the pump with lowered requirements as to the manufacturing tolerances of parts, a simplified manner of venting, and the sealing of the atomizer against leakage when the atomizer is placed in any arbitrary rest position. A sleeve having a smaller inner diameter than the cylinder is mounted on the upper part of the cylinder of the pump and its upper part is in contact with the inner part of a neck of a housing for the atomizer. A free space between the inner wall of the housing and the outer wall of the cylinder of the pump is connected below with the interior of the bottle on which the atomizer is mounted, and the upper part of the free space communicates with the surface of a tube by radial channels passing through the sleeve of the cylinder. The tube slidingly passes through the neck of the housing, is connected on the top with an operating button, and ends below with a sealing cuff piston which covers, when in its upper position, the radial channels and, at the same time, bears by its upper part on the neck of the housing. The tube forms a part of a narrow upper part of a piston rod which reciprocates through the sleeve, whereas the lower broadened part of the piston rod bears the piston of the pump and a one-way valve.

U.S. Pat. No. 4,646,969 issued to Miloslav Sorm et al. describes a double-acting mechanical liquid spraying device having a housing which is adapted to be mounted upon and sealed to the neck of a liquid container, and which has a liquid-containing compartment therein. In the housing, aligned with the liquid-containing compartment, there is an operation cylinder which has an annular valve seat disposed transversely to an intermediate the length of such cylinder. Disposed within the liquid-containing compartment is a liquid pumping plunger of the cuff type which cooperates with the valve seat to close the opening through such seat when the plunger is in its forward terminal position, and which is driven to reciprocate within the liquid-containing compartment in forward and reverse liquid dispensing strokes. In each of such strokes the plunger forwards liquid from the liquid-containing compartment to a spray nozzle through a liquid-conducting passage. Interposed in the liquid-conducting passage between the plunger and the spray nozzle are a relief valve and a relief passage which bleed liquid back to the liquid container and allow atmospheric air to be drawn in through the spray nozzle at the end of the reverse stroke of the plunger, thereby to clear the spray nozzle of liquid at the end of each pumping cycle consisting of a forward and a reverse stroke. As a consequence, fast-drying liquids can be sprayed with the device of the invention.

Notwithstanding the above prior art, there are no teachings or suggestions that would render the present invention anticipated or obvious. In fact, the Czech double action sprayers rely upon a cuff type piston and valve and this cuff acts as a valve by being spread open on the upstroke so as to prevent passage of liquid past it and squeezed closed on the downstroke so as to permit liquid to pass by it. However, this cuff acts as a valve with its seat being essentially the side walls of the chamber. In other words, the cuff and chamber walls move relative to one another and this abrasion causes leakage, unusual wear and sometimes volume problems. Thus, the present invention is directed to overcoming these shortcomings of the aforesaid prior art.

SUMMARY OF THE INVENTION

The present invention is a continuous action spray dispenser for spraying liquid material therefrom. It includes a main housing with a housing outlet and a housing inlet, adapted to receive a pumping rod and having means for connection to a container. It also includes a pumping rod which is at least partially located within said main housing so as to be vertically reciprocally movable therein. The rod has a predetermined shape, volume and displacement with a first, upward position and a second, downward position and includes a valve seat and one-way valve which permits liquid material to pass therethrough in a relative direction toward the outlet, but not toward the inlet. There is also an inlet valve seat and valve connected to the inlet of the main housing and arranged so as to permit flow of fluid material into, but not out of, the main housing inlet. There is a top housing connected to the upper end of the main housing adapted for reciprocal movement with an activator. There is an outlet channel and spray nozzle, as well as a spring mechanism, cooperatively located between the activator and the top housing which biases the activator and pumping rod to their first position.

BRIEF DESCRIPTION OF THE DRAWINGS

The present invention will be more fully understood when the specification herein is taken in conjunction with the drawings appended hereto, wherein.

DETAILED DESCRIPTION OF THE PRESENT INVENTION

Figure 1:
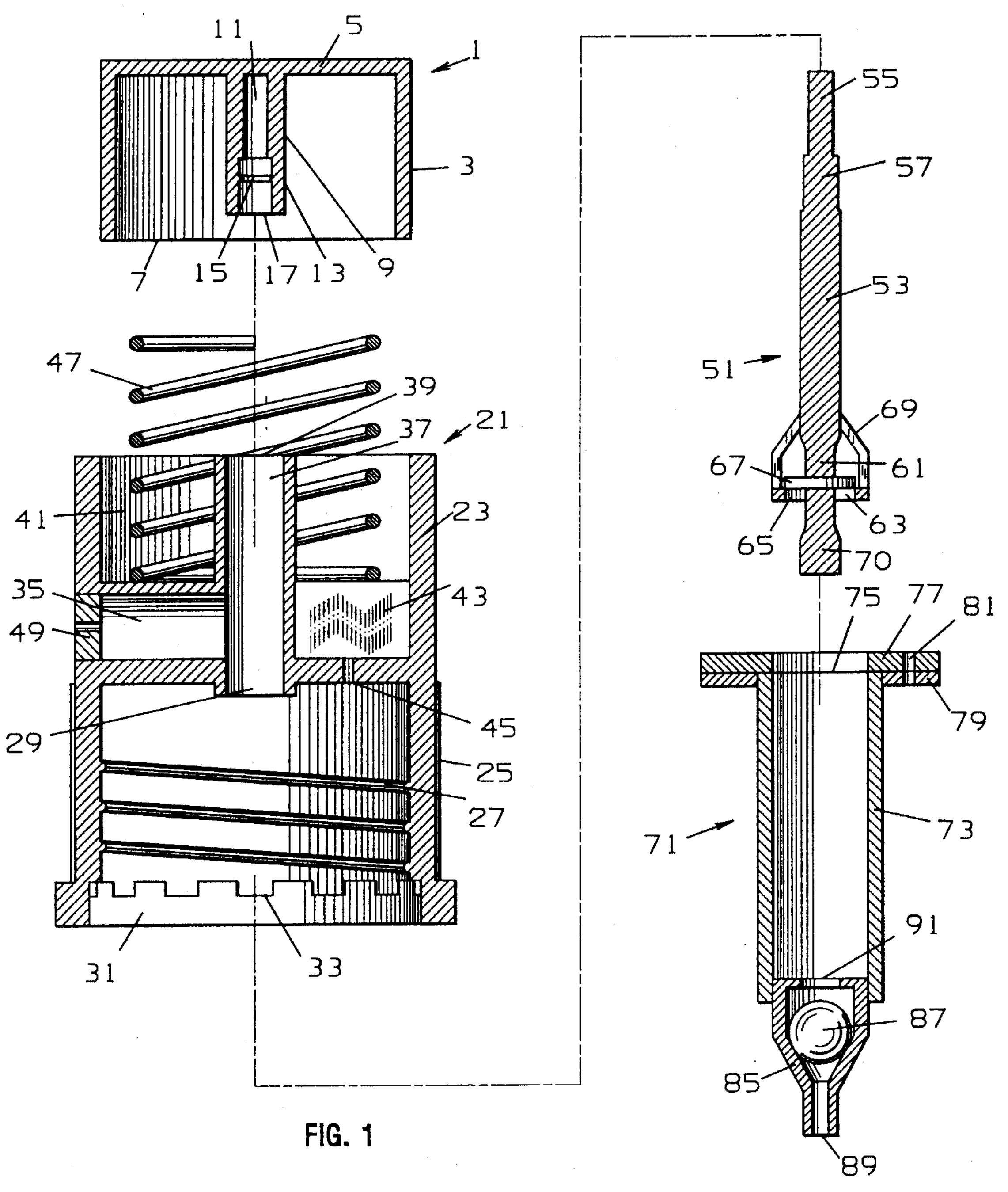
FIG. 1 shows a front, partially cut, exploded view of a present invention device using a one way washer-type valve.

The present invention is a continuous action spray dispenser which is used for spraying liquid material. The dispenser is comprised of the following components:

(a) A main housing, which is vertically elongated and hollow. It has an upper end with a housing outlet and a lower end with a housing inlet. The main housing is adapted to receive a pumping rod therein and has means for connection to a container.

(b) A pumping rod, which is at least partially located within the main housing so as to be vertically reciprocally movable therein. The pumping rod has a predetermined shape, volume and displacement and has a first position and a second position within the main housing. The first position results from upward movement and establishes a minimum portion of volume of said rod within said main housing, and permits a predetermined maximum available volume for liquid material within the main housing. The second position results from downward movement and establishes a maximum portion of volume of said rod within said main housing, and permits a predetermined minimum available volume within the main housing for liquid material due to volume displacement by the pumping rod. The pumping rod includes thereon a valve seat and one way valve. The valve seat and one way valve both move together with the pumping rod when the pumping rod is moved. The one way valve permits liquid material to pass therethrough in a relative direction toward the main housing outlet, but not toward the main housing inlet. Thus, it opens when the rod is pushed downward, and remains closed when the rod is moved upward.

(c) An inlet valve seat and valve, which is connected to the inlet of the main housing. It is arranged so as to permit flow of liquid material into, but not out of, the main housing inlet. Thus, when the rod is pushed downward, this valve is closed, and when the rod is moved upward, this valve is open and liquid is pumped into the main housing.

(d) A top housing, which is connected to the upper end of the main housing. This has a portion of the pumping rod pass therethrough for connection to, and for reciprocal movement with, an activator. The top housing establishes a liquid seal about the main housing and the pumping rod.

(e) An activator, which is located above the top housing for reciprocation relative thereto the activator being connected to the pumping rod for reciprocal movement. The activator has a first position and a second position corresponding to the pumping rod's first position and second position.

(f) An outlet channel and spray nozzle. The outlet channel has a lower end connected to the main housing outlet and has an upper end connected to the spray nozzle. The outlet channel and spray nozzle are located on either the top housing or the activator.

(g) A spring mechanism, which is cooperatively located between the activator and the top housing and biasing the activator and pumping rod to their position.

When the main housing is connected to a container having liquid therein and the activator is reciprocated to prime, the activator and therefore the pumping rod is then moved from the first position to the second position. The liquid material in the main housing is displaced, it cannot exit through the main housing inlet due to the inlet valve. The liquid material passes through the pumping rod one way valve and seat and at least a portion thereof exits through the main housing outlet, outlet channel and nozzle for spraying. When the activator and therefore the pumping rod is then returned from the second position to the first position via return of said spring mechanism, liquid material in the main housing above said pumping rod one way valve and seat exits through the main housing outlet. Outlet channel and nozzle for spraying and the pumping rod and closed one way valve and seat simultaneously also act to pump liquid material from the container to the main housing. This loads the main housing for a next reciprocal cycle, and thereby creates continuous action spray on upstrokes and downstrokes of the pumping rod.

FIG. 1 shows a front, partially cut, exploded view of a present invention device which includes a top housing 21 with a sidewall 23 and a lower, outwardly serrated sidewall 25 with threading 27 on its inside, as shown for connection to a threaded container. This top housing 21 is vertically elongated and hollow, as shown. There is a outlet channel 35 and a top housing inlet 29. There is also an open shaft 37 directly aligned with housing inlet 29 and adapted to receive an activator 1. There is a spring 47 located in upper opening 41 which rests atop outlet channel 35 and spray nozzle 49, as well as atop spring support plate 43. At the lower end 31 of top housing 21 there are optional ratchets or teeth 33 adapted to render the top housing 21 locked onto a container. Activator 1 has a sidewall 3 and a top 5 with an open bottom 7 and is of adequate dimensions to fit within upper opening 41 and over spring 47 with shaft 9 adapted to snugly fit in a sealed fashion within open shaft 37. Shaft 9 includes an open end 17 with a hollow section 11 and a ridge 15 and wider lower section hollow area 13 and this is adapted to attach to a pumping rod 51.

Part of FIG. 1 includes a partially cut view of pumping rod 51 and an uncut view of a washer-type valve 67 and a cut view of a spider valve support 69. Pumping rod 51 has a narrower mid-neck 57 and a very narrow top neck 55 which fit on a force fit basis into activator 1 and more specifically into hollow section 11 of shaft 9. There is a main section 53 of pumping rod 51 and when this is connected with activator 1 after activator 1 has been inserted into top housing 21, it is vertically reciprocally movable within the top housing at least in part. In other words, a user will depress activator 1 which will act as an actuator and that will put pressure on and compress spring 47 and move both activator 1 and pumping rod 51 downwardly. When the user releases pressure thereon, the spring will force activator 1 upwardly and this will carry pumping rod 51 upwardly as well. As can be seen, pumping rod 51 has a predetermined shape, volume and displacement and due to the reciprocal action of activator 1, pumping rod 51 has a first position and a second position within top housing 21, the first position resulting from upward movement, in other words, from the spring holding it in the upward position, and the second position resulting from downward movement.

Pumping rod 51 includes, as mentioned, spider valve support 69 which includes a plurality of inlets such as 63 and 65 and a washer-type valve 67. This is attached to a narrower or constricted portion 61 of pumping rod 51 and contains therein a washer-type valve 67. When pumping rod 51 is pushed downwardly, valve 67 moves up and water or other liquid is able to pass through inlets such as inlets 63 and 65. When pumping rod 51 is moved upwardly, washer-type valve 67 is forced down and seals off openings 63 and 65 and no liquid is allowed to pass therethrough. Not only is the upper portion of pumping rod 51 inserted into shaft 9 of activator 1 and top housing 21, but it also fits into a main housing 71 which acts as a chamber for the pumping action. Thus, when pumping rod 51 is inserted into main housing 71 and main housing 71 is fitted onto top housing inlet 29 at its main housing outlet 75, air vent 81 including the air vent of washer 79 is aligned with air vent 45. There is a main housing inlet 91 with a one way ball valve 87 and tapered base 85 acting as its seat with a tube extension 89 adapted to attach to a dip tube. End 70 of pumping rod 51 will act as a stop against main housing inlet 91 when reciprocation occurs.

It should now be seen that when tap housing 21 is connected to a container having liquid therein and the activator 1, and therefore the pumping rod 51 are moved from their first position to their second position, liquid material in the main housing is displaced, and the displaced liquid material passes through the pumping rod one way washer-type valve 67, and inlets 63 and 65 and at least a portion of that liquid exits through main housing outlet 75, outlet channel 35 and nozzle 49 for spraying. Further, when activator 1 and therefore pumping rod 51 is released and returned to its upward, second position via the spring mechanism of spring 47, liquid material in the main housing above the pumping rod valve 67 will exit through main housing outlet 75, outlet channel 35 and nozzle 49 for spraying. Thus, the pumping rod 51 and closed washer-type valve 67 will simultaneously act to open up one way valve 87, to pump liquid from the container into the main housing below washer-type valve 67 and, thereby loading the main housing 71 for the next reciprocal cycle and, at the same time, forcing liquid that is located above washer-type valve 67 out spray nozzle 49. In other words, the device operates so as to spray both on the downstroke and on the upstroke and to reload the main housing for the next reciprocation on its return cycle.

Figure 2:
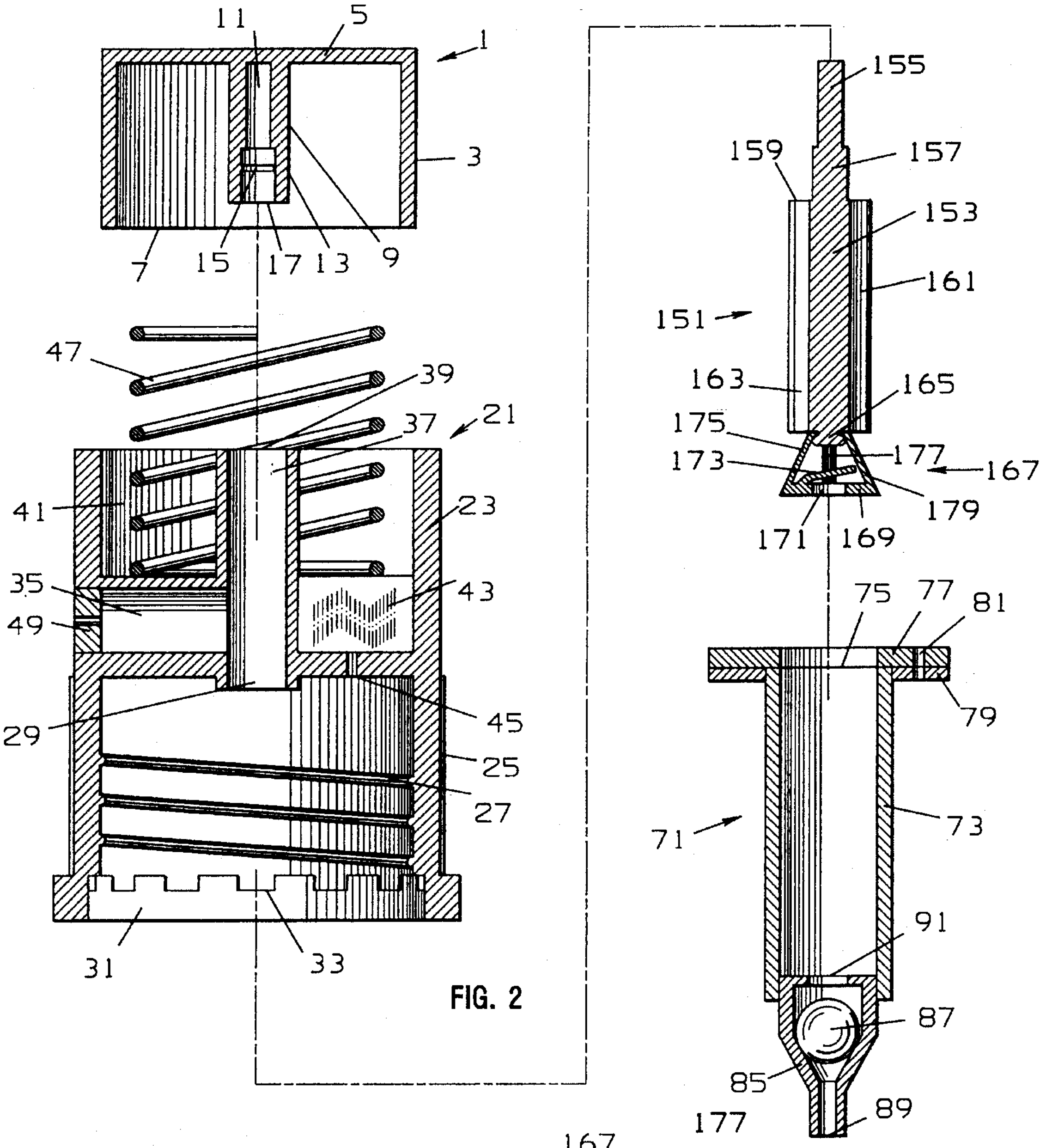
FIG. 2 shows a front, partially cut, exploded view of a present invention device similar to that shown in FIG. 1 except that a one way spider valve is used.
Figure 3:
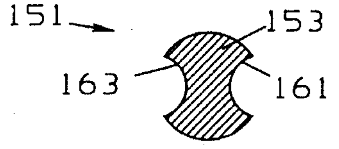
FIG. 3 shows a cut top view of the piston rod of the present invention device shown in FIG. 2
Figure 4:
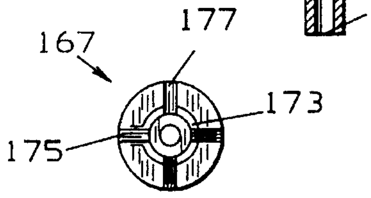
FIG. 4 illustrates a top view of the spider valve in the present invention device shown in FIG. 2.

FIG. 2 shows a front, partially cut view of an alternative present invention device and many of the parts are identical to those shown in FIG. 1 and are identically numbered. However, note that the shaft 9 and the open column 37 of activator 1 and top housing 21 have been widened to adapt to the wider width of the pumping piston 151. Otherwise, activator 1 and top housing 21 are identical to that shown in FIG. 1. However, in this embodiment, there is a pumping rod 151 which is shown in its top view in FIG. 3 and has a main section 153 and arcuated cut outs 161 and 163 to allow liquid to pass by it as well as a narrower neck 157 and a narrowest neck 155, again adapted to tightly fit into activator 1. At the bottom of pumping rod 151 is a snap bead knuckle 165 adapted to receive one way spider valve 167. This is shown in its top view in FIG. 4 and includes four uprights biased inwardly to attach to knuckle 165, an opening 171, a base 169 which acts as a seat, and flap valve 173. Flap valve 173 functions generally in the same manner as washer-type valve 67 and is closed when pumping rod 151 moves upward and is open when it moves downward.

Main housing 71 is substantially the same as that shown in FIG. 1 except that a recess in tapered base 85 near the top and a ribbing or protrusion 181 at the bottom of the chamber portion 73 of main housing 71 are interfitted instead of being glued or heat welded such as would be done in the arrangement shown in FIG. 1.

Figure 5:
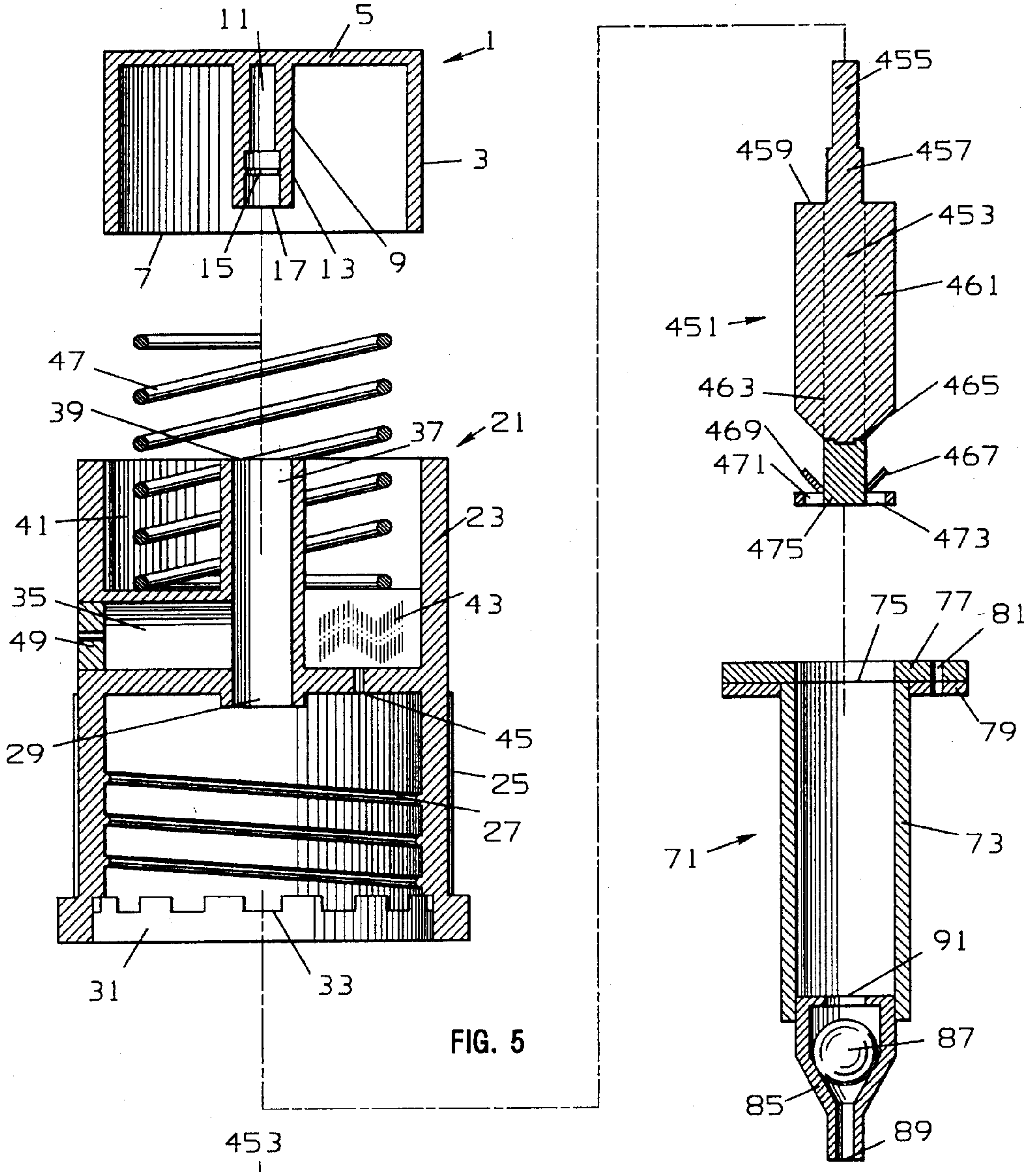
FIG. 5 shows yet another variation of a present invention device in a front, partially cut, exploded view.
Figure 6:
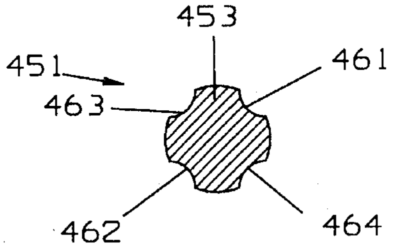
FIG. 6 shows a top cut view of the piston rod used in the device shown in FIG. 5.

FIG. 5 shows yet another alternative embodiment present invention, both as to the shape of the pumping rod and the type of valve. Here, all of the numbers utilized in FIGS. 1 and 2 are used for the same parts. Note, however, that FIGS. 5 and 6 show the cut, front view and cut, top view of pumping rod 451. It includes a main section 453 with semi-circular cutouts 461, 462,463 and 464. There are narrower and narrowest necks 457 and 455, respectively for insertion into actuator 1. At the bottom of pumping rod 451 is an attachment knuckle 465 adapted to receive valve and valve seat shown generally as valve mechanism 475. There is a plurality of flap valves such as valves 467 and 469 connected to openings 473 and 471, respectively. There could be two, three or four such valves and these operate similarly to the valves discussed with respect to FIGS. 1 and 2 which are attached to the pumping rods shown therein. In other words, they open when the pumping rod 451 is pushed downwardly and are forced closed when pumping rod 451 moves upwardly.

Figure 7:
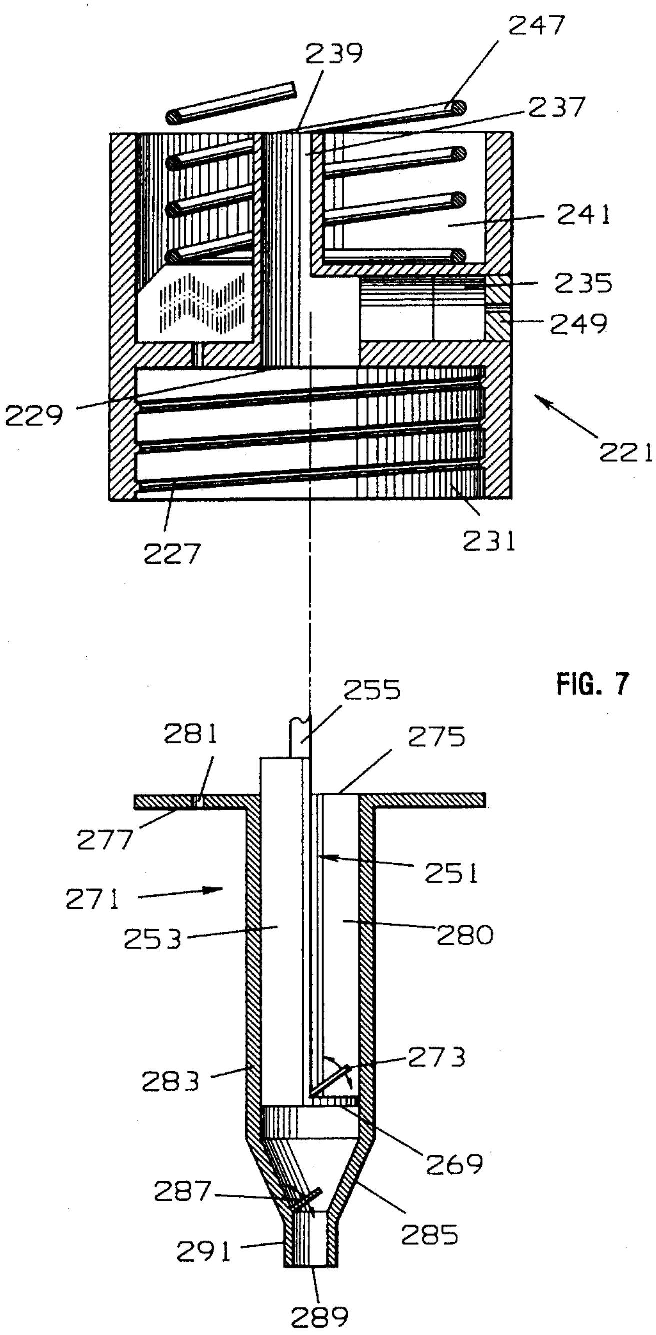
FIG. 7 shows an alternative present invention device using an asymmetric piston rod and FIG. 8 shows a top cut view thereof; and, FIG. 9 shows an alternative cut section of a present invention device having a general front view such as that which is shown in FIG. 7.

FIG. 7 an alternative embodiment front, partially cut, exploded view of a present invention device wherein the actuator would be essentially the same as actuator 1, shown in the previous Figures, but with the shaft 9 slightly off-centered or at least having a hollow area drilled slightly off-center so as to receive connecting stem 255. Here, top housing 221 has an open area 241, spring 247, orifice 239 and shaft 237 for receiving the actuator, outlet channel 235, spray nozzle 249, opening 229 and base area 231 with threads 227. Main housing 271 includes a chamber 283 and a top flange 277 with an air vent 281. It also includes a tapered portion 285, a main housing inlet 289 with tube connection 291 and one way flap valve 287. One way flap valve 287 operates in a fashion similar to ball valve 87 discussed above in conjunction with main housing 71 shown in the previous Figures. Contained within main housing 271 is pumping rod 251 which has a main body 253, a protruding area 269, and a one way flap valve 273. A cut top view of both the main housing 271 and the pumping rod 251 is shown in FIG. 8.

Figure 8:
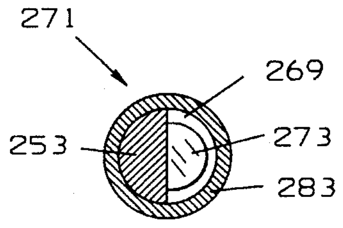

Referring to both FIG. 7 and FIG. 8, it can be seen that the cross section of pumping rod 251 is half of a circle and protruding area 269 completes the circle. There is a substantial open area 280 in which liquid is moved up by the upward movement of an actuator (not shown) and pumping rod 251 with one way flap valve 273 closed. Also, as pumping rod 251 is moved upwardly, the area below protruding area 269 is filled with water or other liquid by being pumped up from a tube as one way flap valve 287 would then be in the open position. Thus, as pumping rod 251 moves upward, valve 273 is closed and valve 287 is opened. When pumping rod 251 is moved downwardly, one way valve 273 is opened and one way valve 287 is closed, so that open area 280 is refilled. Thus, this performs in the same general manner as the present invention device is described in all of the previous Figures.

Figure 9:
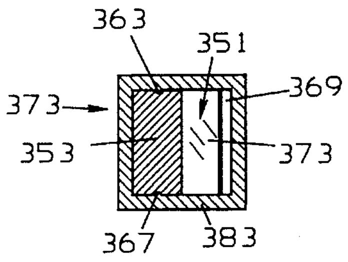

FIG. 9 shows an alternative arrangement for a rectangular present invention device wherein the main housing 373 includes four flat sidewalls, such as sidewall 383 and the pumping rod 353 would have a rectangular shape, as shown and having flap valve 378 and valve seat 369. There would be indentations with guide protrusions such as protrusions 363 and 367 to keep the pumping rod 351 from cantilevering.

It should now be seen that the present invention double action sprayer has an enhanced arrangement, whereby the valve which moves with the pumping rod does not frictionally drag against its seat nor does it move in such a way that it could wear out or fail along side walls as the valve seat itself moves with the valve and the pumping rod in the present invention device.

Obviously, numerous modifications and variations of the present invention are possible in light of the above teachings. It is therefore understood that within the scope of the appended claims, the invention may be practiced otherwise than as specifically described herein.

What is claimed is:

1. A continuous action spray dispenser for spraying liquid material therefrom, which comprises:

a) a main housing which is vertically elongated and hollow and has vertical walls and has an upper end with a housing outlet and a lower end with a housing inlet, said main housing being adapted to receive a pumping rod therein;

b) a pumping rod which is at least partially located within said main housing so as to be vertically reciprocally movable therein, said pumping rod having a predetermined shape, volume and displacement and having a first position and a second position within said main housing, said first position resulting from upward movement and establishing a minimum portion of volume of said rod within said main housing and permitting a predetermined maximum available volume within said main housing for liquid material, said second position resulting from downward movement and establishing a maximum portion of volume of said rod within said main housing and permitting a predetermined minimum available volume within said main housing for liquid material due to volume displacement by said pumping rod, and said pumping rod including thereon a valve seat and one way valve such that said valve seat and one way valve both move together with the pumping rod when said pumping rod is moved, said one way valve permitting liquid material to pass therethrough in a relative direction toward said main housing outlet, but not toward said main housing inlet, both said valve seat and said one way valve being located on said pumping rod such that when said pumping rod is at least partially located within said main housing, said valve seat and said one way valve are also located within said main housing and such that said one way valve does not contact said main housing vertical walls when said pumping rod is located within said housing;

c) an inlet valve seat and valve connected to the inlet of said main housing and arranged so as to permit flow of fluid material into, but not out of, said main housing inlet;

d) a top housing connected to the upper end of said main housing and having a portion of said pumping rod pass therethrough for connection to, and for reciprocal movement with, an activator, said top housing establishing a liquid seal about said main housing and said pumping rod, said top housing having an attachment mechanism for attachment of said dispenser to a container;

e) an activator located above said top housing for reciprocation relative thereto, said activator being connected to said pumping rod for reciprocal movement therewith, said activator having a first position and a second position corresponding to said pumping rod first position and second position;

f) an outlet channel and spray nozzle, said outlet channel having a lower end connected to said main housing outlet and having an upper end connected to said nozzle, said outlet channel and spray nozzle being located on one of said top housing and said activator; and, g) a spring mechanism cooperatively located between said activator and said top housing and biasing said activator and pumping rod to their first position;

such that when said main housing is connected to a container having liquid therein and said activator is reciprocated to prime, when said activator and therefore said pumping rod is then moved from said first position to said second position, liquid material in said main housing is displaced and the displaced liquid material passes through said pumping rod one way valve and seat and at least a portion thereof exits through said main housing outlet, outlet channel and nozzle for spraying, and when said activator and therefore said pumping rod is then returned from said second position to said first position via return of said spring mechanism, liquid material in said main housing above said pumping rod one way valve and seat exits through said main housing outlet, outlet channel and nozzle for spraying, and said pumping rod and closed one way valve and seat simultaneously also act to pump liquid material from said container to said main housing, thereby loading said main housing for a next reciprocal cycle, and thereby creating continuous action spray on upstrokes end downstrokes of said pumping rod.

2. The continuous action spray dispenser of claim 1 wherein said pumping rod one way valve and seat is a one way flap valve and seat.

3. The continuous action spray dispenser of claim 1 wherein said pumping rod one way valve and seat is a spider valve and seat.

4. The continuous action spray dispenser of claim 1 wherein said pumping rod one way valve and seat is a ball valve and seat.

5. The continuous action spray dispenser of claim 1 wherein said inlet valve seat is integrally formed as part of said main housing and said top housing is separately formed and attached to said main housing.

6. The continuous action spray dispenser of claim 1 wherein said inlet valve seat is formed separately from said main housing and attached thereto and said top housing is integrally formed with said main housing.

7. The continuous action spray dispenser of claim 1 wherein said inlet valve seat extends downwardly to act as a dip tube.

8. The continuous action spray dispenser of claim 1 which further includes a dip tube attached thereto.

9. The continuous action spray dispenser of claim 1 wherein said inlet valve and seat is a one way flap valve and seat.

10. The continuous action spray dispenser of claim 1 wherein said inlet valve and seat is a spider valve and seat.

11. The continuous action spray dispenser of claim 1 wherein said inlet valve and seat is a ball valve and seat.

12. The continuous action spray dispenser of claim 1 wherein an air vent is included in at least one of said main housing, top housing and activator to permit air to displace consumed liquid of a container to which said dispenser may be attached.

13. The continuous action spray dispenser of claim 1 wherein said top housing has means for attachment to a container which includes a threaded attachment mechanism as part of said top housing, and a separate attachment component adapted for non-threaded attachment to a container and having threads for cooperation with said threaded attachment mechanism.

14. The continuous action spray dispenser of claim 1 wherein said main housing has a cylindrical hollow area with a circular cross-section and an imaginary central axis vertically therethrough.

15. The continuous action spray dispenser of claim 14 wherein said pumping rod is fitted to an arc of said cylindrical hollow area, has a cut circular D-shaped cross-section, and is biased to one side of said imaginary central axis and said pumping rod one way valve and seat is biased to an opposite side of said imaginary central axis.

16. The continuous action spray dispenser of claim 14 wherein said pumping rod is fitted to said cylindrical hollow area, has at least two vertical passages cut therein and is symmetrical with respect to said imaginary central axis.

17. The continuous action spray dispenser of claim 14 wherein said pumping rod has a cross-section smaller than the circular cross-section of said cylindrical hollow area of said main housing.

* * * * *